US012711782B2

(12) United States Patent
Nagoshi et al.

(10) Patent No.: US 12,711,782 B2
(45) Date of Patent: Aug. 18, 2026

(54) INFORMATION PROCESSING APPARATUS

(71) Applicant: TOYOTA JIDOSHA KABUSHIKI KAISHA, Toyota (JP)

(72) Inventors: Kazuaki Nagoshi, Toyota (JP); Hideaki Bunazawa, Nagoya (JP); Yugo Nishida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 18/422,831

(22) Filed: Jan. 25, 2024

(65) Prior Publication Data

US 2024/0420485 A1 Dec. 19, 2024

(30) Foreign Application Priority Data

Jan. 27, 2023 (JP) ................................ 2023-010985

(51) Int. Cl.
*G06V 10/82* (2022.01)
*G06V 20/58* (2022.01)
*G07C 5/02* (2006.01)

(52) U.S. Cl.
CPC ............ *G06V 20/582* (2022.01); *G06V 10/82* (2022.01); *G07C 5/02* (2013.01)

(58) Field of Classification Search
None
See application file for complete search history.

(56) References Cited

U.S. PATENT DOCUMENTS

| | | | | |
|---|---|---|---|---|
| 2014/0350777 | A1 | 11/2014 | Kawai et al. | |
| 2016/0275793 | A1 | 9/2016 | Yokochi et al. | |
| 2018/0045516 | A1* | 2/2018 | Sumizawa | G01C 21/005 |
| 2019/0065871 | A1* | 2/2019 | Pogorelik | G06V 10/82 |
| 2019/0295003 | A1* | 9/2019 | Dronen | G06V 10/774 |
| 2022/0196431 | A1 | 6/2022 | Tanikawa et al. | |
| 2024/0005643 | A1* | 1/2024 | Suzuki | G16H 20/40 |

FOREIGN PATENT DOCUMENTS

| | | | |
|---|---|---|---|
| JP | 2012-164254 | A | 8/2012 |
| JP | 2014-229228 | A | 12/2014 |
| JP | 2015-102898 | A | 6/2015 |
| JP | 2016-173338 | A | 9/2016 |
| JP | 2019-212188 | A | 12/2019 |
| JP | 2020-123213 | A | 8/2020 |
| JP | 2022-096906 | A | 6/2022 |

* cited by examiner

*Primary Examiner* — Tsung Yin Tsai
(74) *Attorney, Agent, or Firm* — Finnegan, Henderson, Farabow, Garrett and Dunner, LLP

(57) ABSTRACT

An information processing apparatus includes an image processing unit configured to detect a road sign from an image taken by an in-vehicle camera and configured to calculate a reliability indicating a probability that the road sign is of a specific type, and a determination processing unit configured to determine presence or absence of the road sign of the specific type in the image, in a case of the reliability less than a threshold value, by referring to map information indicating a position of the road sign of the specific type on a map based on a position at which the image is taken.

3 Claims, 8 Drawing Sheets

9
1
DRIVING DIAGNOSIS APPARATUS
10
CPU
100
OPERATION CONTROL UNIT
101
DATA ACQUISI- TION UNIT
102
OBJECT DETECTION UNIT
103
SIGN DETERMINA- TION UNIT
104
DRIVING EVALUATION UNIT
11
ROM
12
RAM
19
14
COMMUNI- CATION PORT
15
I/O PORT
13
HDD
130
IMAGE DATA
131
VEHICLE POSITION DATA
132
EVALUATION DATA
IMAGE AND POSITION DATA
A
B

INFORMATION PROCESSING APPARATUS

CROSS-REFERENCE TO RELATED APPLICATION

This application is based upon and claims the benefit of priority of the prior Japanese Patent Application No. 2023-010985, filed on Jan. 23, 2023, the entire contents of which are incorporated herein by reference.

TECHNICAL FIELD

The present disclosure relates to an information processing apparatus.

BACKGROUND

For example, Japanese Unexamined Patent Application Publication No. 2019-212188 describes that a road sign corresponding to a current position is determined based on either an image of the road sign or position information of the road sign.

For example, in a vehicle driving diagnosis, it is needed to identify road signs that are within the driver's field of view. For this reason, a road sign is detected from an image of an in-vehicle camera by an object detection technology using artificial intelligence (AI) or the like rather than the position information of the road sign. However, the road sign might be erroneously detected depending on performance of the in-vehicle camera and environmental conditions such as weather at image taken time.

SUMMARY

It is therefore an object of the present disclosure to provide an information processing apparatus detecting a road sign in an image with high accuracy.

The above object is achieved by an information processing apparatus including: an image processing unit configured to detect a road sign from an image taken by an in-vehicle camera and configured to calculate a reliability indicating a probability that the road sign is of a specific type; and a determination processing unit configured to determine presence or absence of the road sign of the specific type in the image, in a case of the reliability less than a threshold value, by referring to map information indicating a position of the road sign of the specific type on a map based on a position at which the image is taken.

The determination processing unit may be configured to estimate a traveling direction of a vehicle equipped with the in-vehicle camera based on a temporal change in the position at which the image is taken, in the case of the reliability less than the threshold value, when the road sign of the specific type is present in the traveling direction on the map, the determination processing unit may be configured to determine that the road sign of the specific type is present in the image, and in the case of the reliability less than the threshold value, when the road sign of the specific type is not present in the traveling direction on the map, the determination processing unit may be configured to determine that the road sign of the specific type is not present in the image.

The image processing unit may be configured to detect the road sign from the image by using a detection model that is machine-learned by supervised learning and that receives the image and a type of the road sign and outputs the road sign of the specific type.

The determination processing unit may be configured to determine that the specific type of road sign is present in the image, in a case of the reliability equal to or greater than the threshold value.

The information processing apparatus may further include an evaluation processing unit configured to evaluate driving of a vehicle equipped with the in-vehicle camera based on a regulation indicated by the road sign of the specific type, when the determination processing unit determines that the road sign of the specific type is present in the image.

DETAILED DESCRIPTION

Configuration of Driving Diagnosis System

Figure 1A:
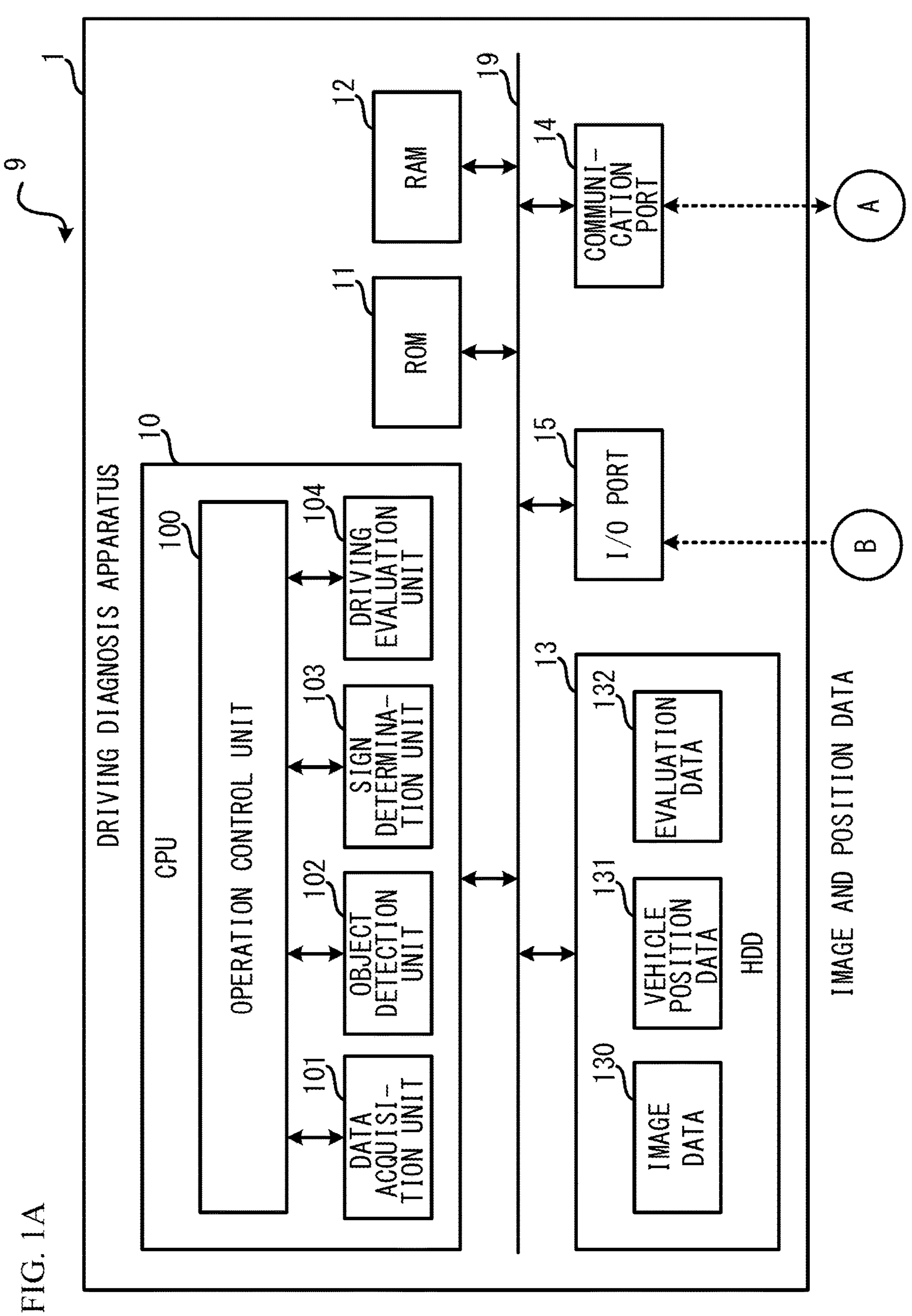
FIGS. 1A and 1B are configuration diagrams illustrating an example of a driving diagnosis system.
Figure 1B:
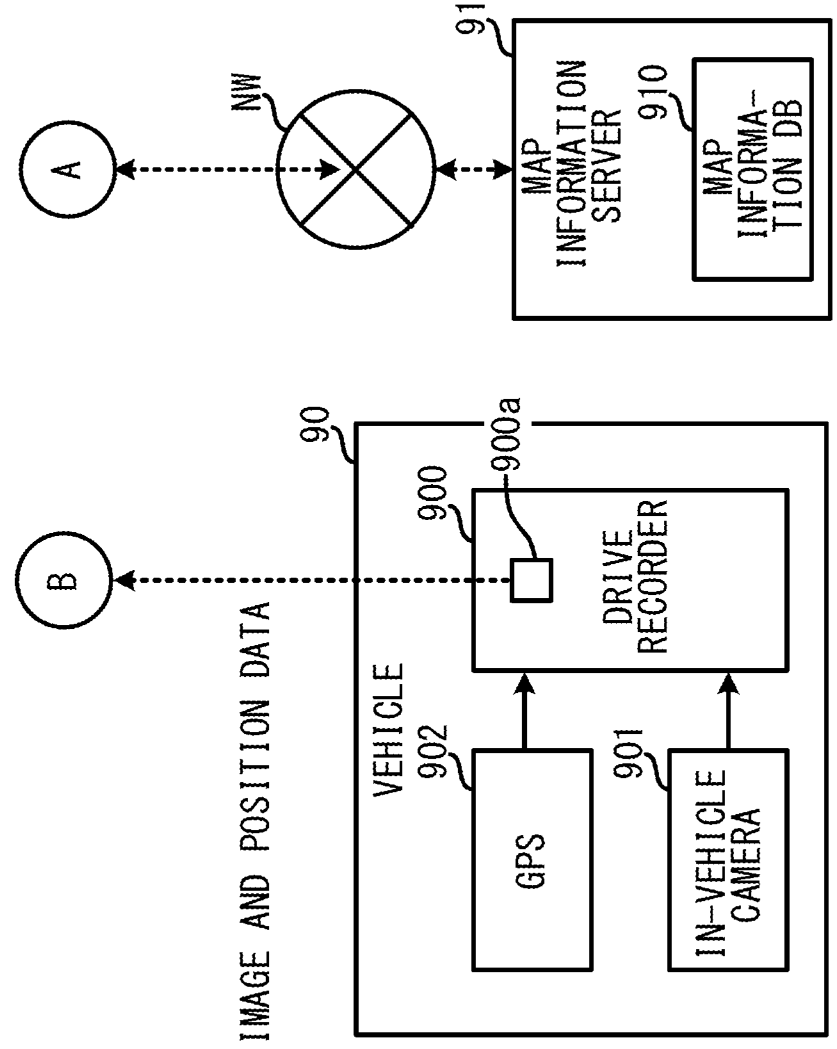

FIGS. 1A and 1B are configuration diagrams illustrating an example of a driving diagnosis system 9. The driving diagnosis system 9 includes a driving diagnosis apparatus 1 that evaluates driving of a vehicle 90, and a map information server 91 that holds a map information database (map information DB) 910 in which positions of road signs are indicated. The driving diagnosis apparatus 1 is an example of an information processing apparatus and is, for example, a computer such as a server.

The map information server 91 provides map information from the map information DB 910 via an Internet NW. The map information server 91 provides map information corresponding to the position of the vehicle 90 transmitted from the driving diagnosis apparatus 1. The map information indicates the positions of road signs on roads. An example of a service provided by the map information server 91 is map matching. The map matching specifies a moving route on a road from the position of the vehicle 90.

The vehicle 90 is, for example, a hybrid vehicle or a gasoline engine vehicle, but is not limited thereto. The vehicle 90 is equipped with a drive recorder 900, an in-vehicle camera 901, and a global positioning system (GPS) 902.

The in-vehicle camera 901 takes an image in the traveling direction of the vehicle 90. The GPS 902 detects latitude and longitude as the position of the vehicle 90. The GPS 902 may be built in the drive recorder 900. The drive recorder 900 records an image taken by the in-vehicle camera 901 in a recording medium **900*a* such as a memory card together with position information detected by the GPS 902**. The position information is an example of a position at which the image is taken.

The driving diagnosis apparatus 1 evaluates driving of the vehicle 90 based on the image data and the position information recorded by the drive recorder 900. The driving diagnosis apparatus 1 includes a central processing unit (CPU) 10, a read only memory (ROM) 11, a random access memory (RAM) 12, a hard disk drive (HDD) 13, a communication port 14, and an input/output (I/O) port 15. The CPU 10 is electrically connected to the ROM 11, the RAM 12, the HDD 13, the communication port 14, and the I/O port 15 via a bus 19 so that signals are input and output to and from each other.

The ROM 11 stores a program for driving the CPU 10. The RAM 12 serves as a working memory for the CPU 10. The communication port 14 is, for example, a communication circuit of a wireless local area network (LAN), and executes communication processing with the CPU 10 via the Internet NW. The I/O port 15 is connected to the recording medium 900*a* such as a memory card, and executes input/output processing of information with the CPU 10.

Upon reading the program from the ROM 11, the CPU 10 generates, as functions, an operation control unit 100, a data acquisition unit 101, an object detection unit 102, a sign determination unit 103, and a driving evaluation unit 104. The HDD 13 stores image data 130, vehicle position data 131, and evaluation data 132.

The operation control unit 100 controls the overall operation of the driving diagnosis apparatus 1. The operation control unit 100 instructs the data acquisition unit 101, the object detection unit 102, the sign determination unit 103, and the driving evaluation unit 104 to perform various operations in accordance with a predetermined sequence.

The data acquisition unit 101 acquires image data and position information from, for example, the recording medium 900*a* of the drive recorder 900 via the I/O port 15. The image data and the position information are attached with image taken time information indicating the time when the image is taken. The data acquisition unit 101 stores the image as the image data 130 and the position information as the vehicle position data 131 in the HDD 13 for each image taken time.

The object detection unit 102 is an example of an image processing unit. The object detection unit 102 detects a road sign from the image data 130 by an object detection technique using artificial intelligence (AI), and calculates reliability (score) of the detection. The object detection unit 102 calculates reliability indicating a probability that a road sign is "STOP" as an example. Note that the "STOP" road sign is an example of a specific type of a road sign, but is not limited thereto, and another type of a road sign may be set as a detection target.

Figure 2:
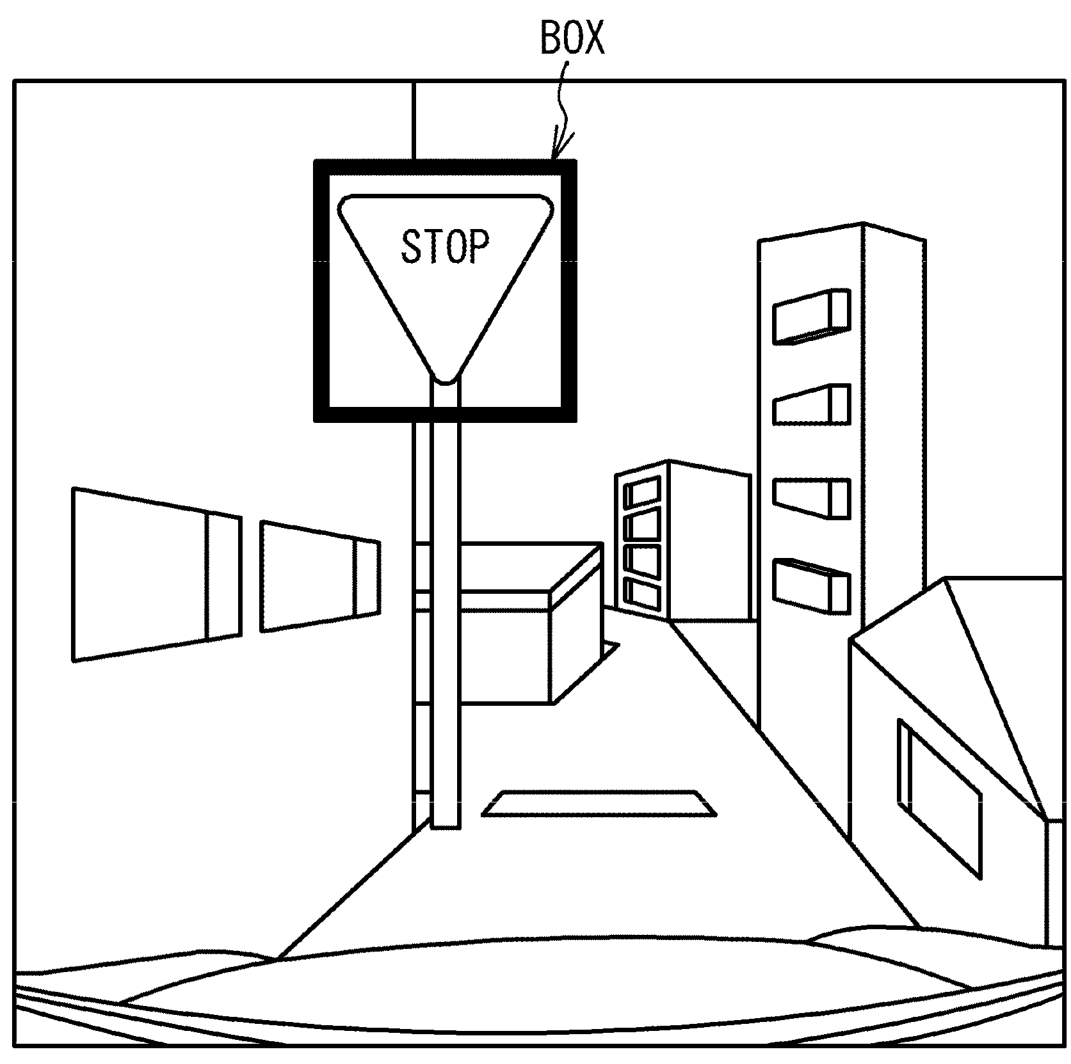
FIG. 2 is a view illustrating an example of a road sign detected from an image.

FIG. 2 is a view illustrating an example of a road sign detected from an image. The object detection unit 102 surrounds an object to be detected with a rectangular bounding box. The object detection unit 102 calculates the reliability indicating a probability that an object in the bounding box is the "STOP" road sign. The reliability is calculated in accordance with a method corresponding to an algorithm of object detection. Examples of the algorithm include, but are not limited to, Region-Convolutional Neural Network (R-CNN).

The object detection unit 102 detects a road sign from an image using a detection model that is machine-learned by supervised learning. In this detection model, an image and a type of a road sign are input, and the "STOP" road sign is output. Specifically, in the learning process of the detection model, a road sign to be detected is designated from images of teaching data, and annotation is performed on the name of the road sign. The detection model is a neural network that mathematically models a human brain function, and determines a weight coefficient of an activation function of a portion corresponding to a neuron based on machine learning. In this way, a detection model that is machine-learned by supervised learning is used. Therefore, the object detection unit 102 quickly detects a road sign.

Referring back to FIG. 1A, the sign determination unit 103 is an example of a determination processing unit. When the reliability is equal to or greater than a threshold value, the sign determination unit 103 determines that a "STOP" road sign is present in the image of the image data 130. Therefore, when the road sign is clearly "STOP" as in the image example illustrated in FIG. 2, the sign determination unit 103 determines that the road sign "STOP" is present in the image based on the reliability calculated by the object detection unit 102. In this case, the driving evaluation unit 104 evaluates driving on the assumption that the "STOP" road sign is in the field of view of the driver of the vehicle 90.

When the reliability is less than the threshold value, the sign determination unit 103 accesses the map information server 91 via the communication port 14 and refers to the map information DB 910 based on the vehicle position data 131. As a result, the sign determination unit 103 determines whether or not there is a "STOP" road sign in the image. For this reason, even when the reliability is less than the threshold value due to performance of the in-vehicle camera 901 and environmental conditions such as weather at the image taken time, the presence or absence of the "STOP" road sign in the image is determined with high accuracy based on the position of the "STOP" road sign indicated by the map information DB 910.

Figure 3A:
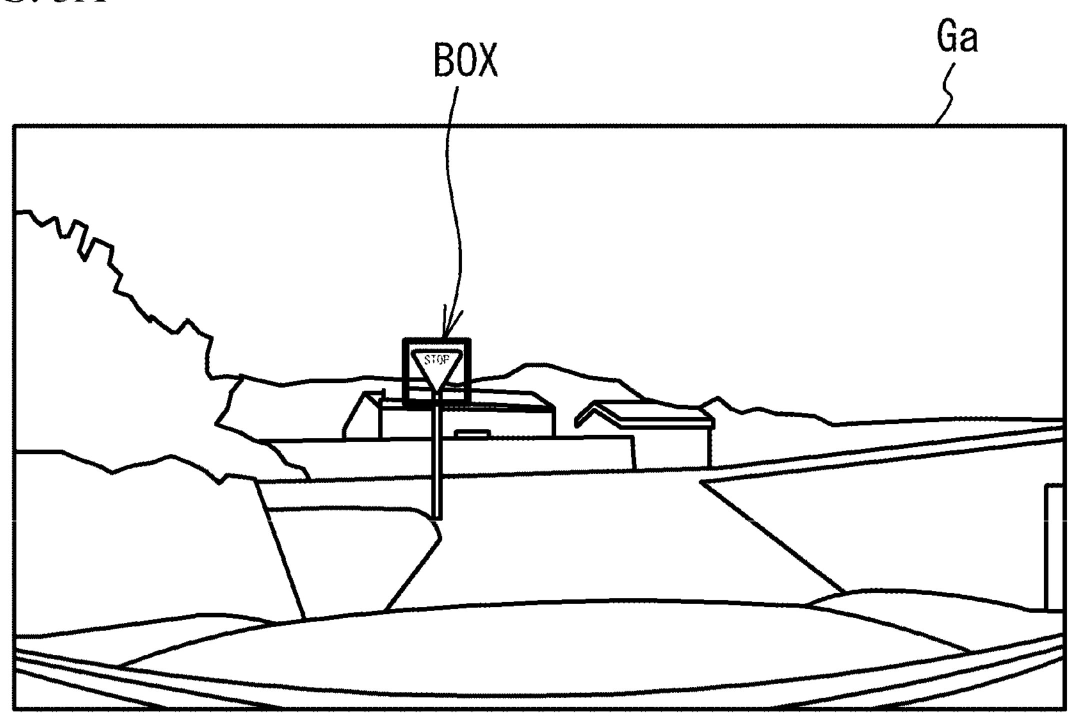
FIGS. 3A and 3B are views illustrating an example of an image and map information in which a "STOP" road sign is present.
Figure 3B:
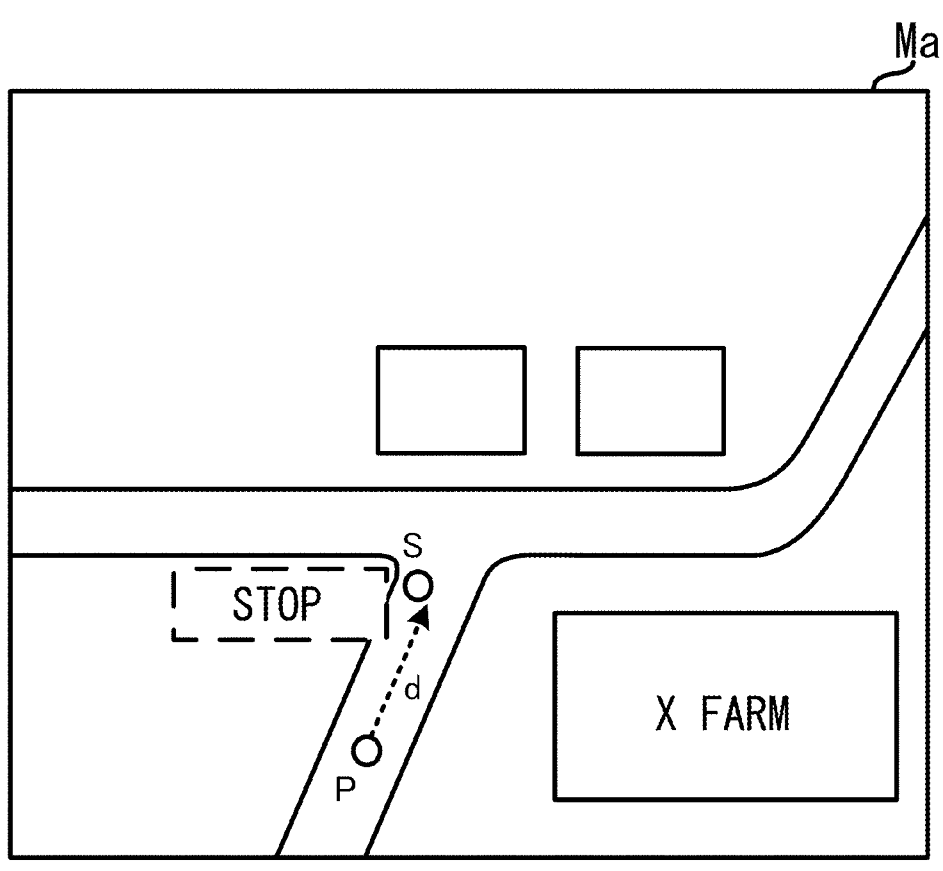

FIGS. 3A and 3B are views illustrating an example of an image Ga and map information Ma in which a "STOP" road sign is present. In the image Ga illustrating the front of the vehicle 90, there is a "STOP" road sign placed at a T-junction. The object detection unit 102 detects the "STOP" road sign from the image data 130 and surrounds the road sign with a bounding box. However, a distance from the vehicle 90 to the road sign is longer than that in the image of FIG. 2, and the weather is cloudy. Therefore, the type of the road sign is unclear, and the object detection unit 102 calculates the reliability less than the threshold value.

Since the reliability is less than the threshold value, the sign determination unit 103 acquires a position P of the vehicle 90 at the time when the image Ga is taken from the vehicle position data 131. The sign determination unit 103 acquires the map information Ma corresponding to the position P of the vehicle 90 from the map information DB 910. The map information Ma indicates a position S of the "STOP" road sign on the map.

The sign determination unit 103 estimates a traveling direction d of the vehicle 90 based on a temporal change in the position P of the vehicle 90 indicated in the image at each time. The sign determination unit 103 determines that the position S of the road sign "STOP" is present in the traveling direction d of the vehicle 90 based on the map information Ma. Therefore, the sign determination unit 103 determines that the road sign "STOP" is in the field of view of the driver of the vehicle 90, and determines that the road sign "STOP" is present in the image. The sign determination unit 103 determines the presence of the road sign by executing geometric calculation processing based on the position P of the vehicle 90, the traveling direction d, and the position S of the road sign.

Figure 4A:
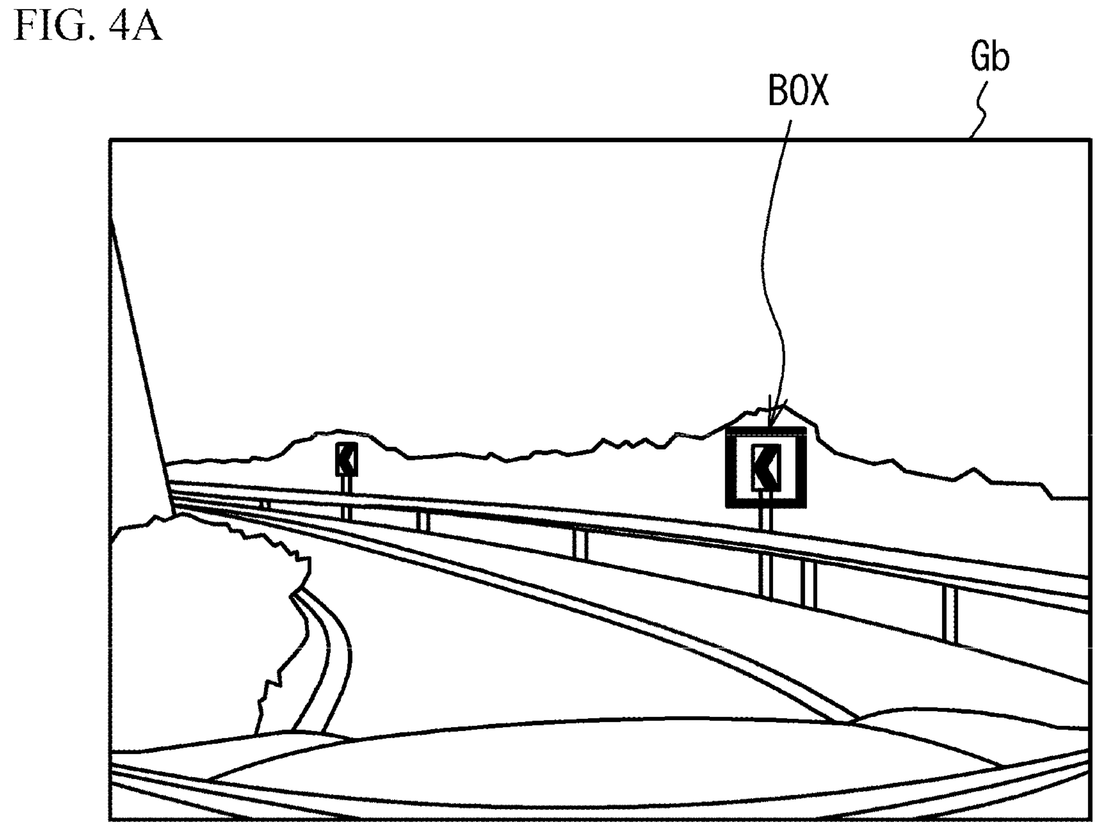
FIGS. 4A and 4B are views illustrating an example of an image not including a "STOP" road sign and map information.
Figure 4B:
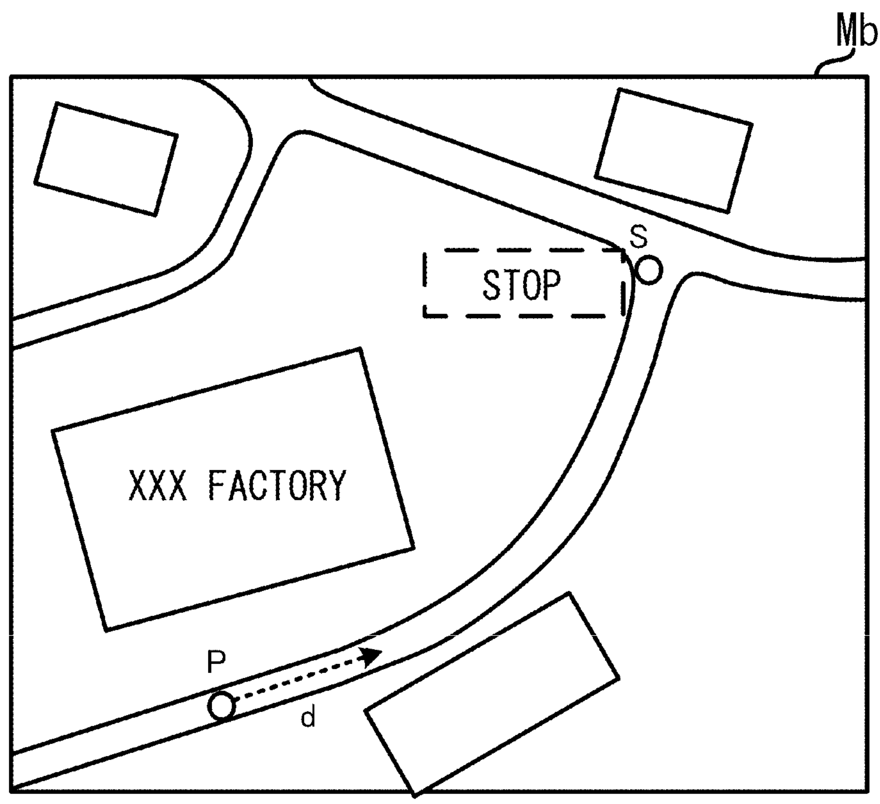

FIGS. 4A and 4B are views illustrating an example of an image Gb not including a "STOP" road sign and the map information Mb. In the image Gb illustrating the front of the vehicle 90, there is a "LEFT CURVE" road sign placed on a curve. The object detection unit 102 detects a "LEFT CURVE" road sign from the image data 130 and surrounds the road sign with a bounding box. However, as compared with the image of FIG. 2, grass is present around the "LEFT CURVE" road sign. Therefore, the type of the road sign is unclear, and the object detection unit 102 calculates the reliability less than the threshold value.

Since the reliability is less than the threshold value, the sign determination unit 103 acquires the position P of the vehicle 90 at the time when the image Gb is taken from the vehicle position data 131. The sign determination unit 103 acquires the map information Mb corresponding to the position P of the vehicle 90 from the map information DB 910. The map information Mb indicates a position S of a "STOP" road sign on the map. In this example, it is assumed that the position S of the "STOP" road sign is not in the driver's field of view at the position P of the vehicle 90.

The sign determination unit 103 estimates a traveling direction d of the vehicle 90 from a temporal change in the position P of the vehicle 90 indicated in the image at each time. The sign determination unit 103 determines that the position S of the "STOP" road sign is not present in the traveling direction d of the vehicle 90 based on the map information Mb. Therefore, the sign determination unit 103 determines that the "STOP" road sign is not within the field of view of the driver of the vehicle 90, and determines that the "STOP" road sign is not present in the image Gb.

As described above, when the road sign "STOP" is present in the traveling direction d of the vehicle 90 on the map, the sign determination unit 103 determines that the road sign is present in the image Ga. When there is no "STOP" road sign in the traveling direction d, the sign determination unit 103 determines that there is no road sign in the image Gb. Therefore, the sign determination unit 103 determines the presence or absence of the "STOP" road sign in the images Ga and Gb from the temporal change of the relative relationship between the position P of the vehicle 90 and the position S of the "STOP" road sign. In this example, the sign determination unit 103 refers to the map information DB 910 of the map information server 91 via the Internet NW, but the present embodiment is not limited thereto. For example, the map information DB 910 may be stored in the HDD 13, and the sign determination unit 103 may refer to the map information DB 910 in the HDD 13.

Referring back to FIG. 1A, when the sign determination unit 103 determines that there is the "STOP" road sign in the image, the driving evaluation unit 104 evaluates the driving of the vehicle 90 based on the road sign. For example, the driving evaluation unit 104 calculates a speed and a moving direction of the vehicle 90 from the vehicle position data 131, and determines whether or not the vehicle 90 sufficiently decelerates at a certain distance or more from the "STOP" road sign. The driving evaluation unit 104 records the determination result of the driving evaluation in the HDD 13 as the evaluation data 132. The evaluation data 132 contributes to improvement of safe driving by being presented as a report to the driver of the vehicle 90.

Operation of Driving Diagnosis Apparatus

Figure 5:
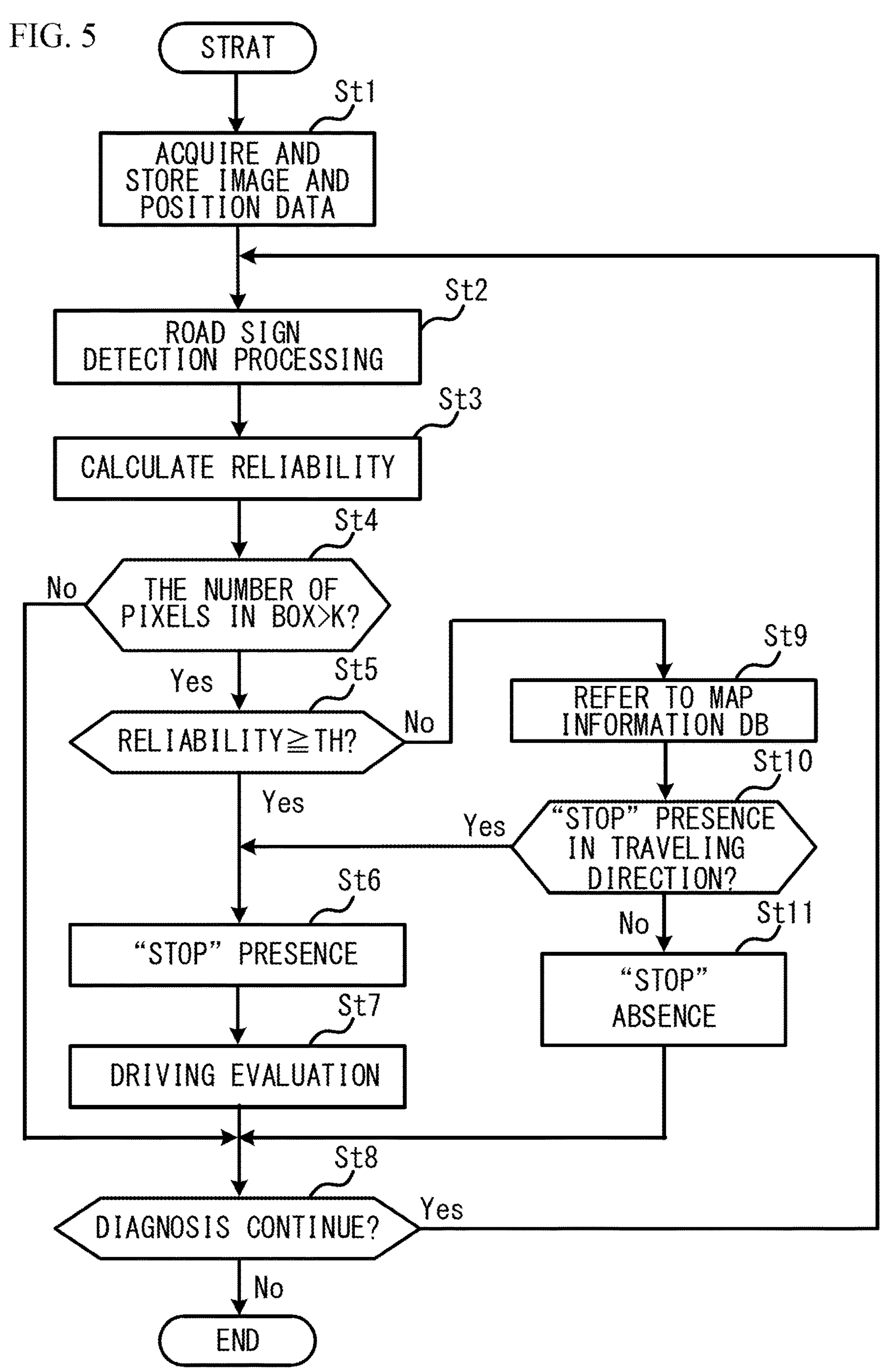
FIG. 5 is a flowchart illustrating an example of the operation of the driving diagnosis apparatus.

FIG. 5 is a flowchart illustrating an example of the operation of the driving diagnosis apparatus 1. This operation is executed, for example, when the operation control unit 100 receives an instruction for driving evaluation from a terminal (not illustrated) via the communication port 14.

First, the data acquisition unit 101 acquires the image data 130 and the vehicle position data 131 from the recording medium 900*a* of the drive recorder 900 and stores them in the HDD 13 (step St1). Note that means for acquiring the image data 130 and the vehicle position data 131 is not limited to this, and may be, for example, wireless LAN communication with the vehicle 90 via the communication port 14.

Next, the object detection unit 102 detects a road sign in an image at a predetermined time in the image data 130 by using the bounding box (step St2). Next, the object detection unit 102 calculates the reliability of the detected road sign (step St3). Although it is desirable that the object detection unit 102 executes detection by AI as described above, the present embodiment is not limited thereto, and the object detection unit 102 may detect a road sign by using another image processing technique.

Next, the sign determination unit 103 compares the number of pixels in the bounding box with a predetermined value K so that noise or an object other than the road sign in the image is not erroneously recognized as the road sign (step St4). The number of pixels is calculated from a set of diagonal positions of the bounding box. When the number of pixels is equal to or less than the predetermined value K (No in step St4), the operation of step St8 described later is executed.

When the number of pixels is greater than the predetermined value K (Yes in step St4), the sign determination unit 103 compares the reliability with a reference value TH (step St5). When the reliability is equal to or greater than the reference value TH (Yes in Step St5), the sign determination unit 103 determines that the "STOP" road sign is present in the image (Step St6). That is, it is determined that the "STOP" road sign is in the field of view of the driver of the vehicle 90 at the time when the image is taken.

Next, the driving evaluation unit 104 evaluates driving according to the "STOP" road sign from the position indicated by the vehicle position data 131 (step St7). For example, the driving evaluation unit 104 estimates the speed of the vehicle 90 from a temporal change in the position of the vehicle 90, and determines whether or not the speed is reduced to less than a predetermined value until the vehicle 90 reaches a predetermined position in front of the "STOP" road sign with a certain distance. In the present embodiment, the evaluation example based on the "STOP" road sign is described. However, for example, in a case where the presence of a road sign of "school, kindergarten, day nursery, or the like" is determined, the deceleration of the vehicle 90 may be similarly evaluated.

As described above, when the sign determination unit 103 determines that the road sign "STOP" is present in the image, the driving evaluation unit 104 evaluates the driving of the vehicle 90 based on the regulation indicated by the road sign "STOP". The driving evaluation unit 104 stores the evaluation result in the HDD 13 as the evaluation data 132. Therefore, the driving diagnosis apparatus 1 contributes to improvement of safe driving of the vehicle 90.

Next, the operation control unit 100 determines whether or not to continue the driving diagnosis of the vehicle 90 based on an instruction from the terminals (not illustrated) (step St8). When the driving diagnostic ends (No in Step St8), the driving diagnosis apparatus 1 ends the present operation. In a case where the driving diagnostic is continued (Yes in Step St8), the driving diagnosis apparatus 1 executes each operation after Step St2 with respect to the image at the next time.

When the reliability is less than TH (No in step St5), the sign determination unit 103 refers to the map information DB 910 based on the position of the vehicle 90 indicated by the vehicle position data 131 (step St9). Next, as described with reference to FIGS. 3A, 3B, 4A, and 4B, the sign determination unit 103 determines whether or not there is the "STOP" road sign on the map in the traveling direction based on the reference result of the map information DB 910 (step St10).

When the road sign "STOP" is present in the traveling direction of the vehicle 90 (Yes in Step St10), the sign determination unit 103 determines that the road sign "STOP" is present in the image (Step St6). Thereafter, each operation after step St7 is executed.

When there is no "STOP" road sign in the traveling direction of the vehicle 90 (No in Step St10), the sign determination unit 103 determines that there is no "STOP" road sign in the image (Step St11). As described above, the sign determination unit 103 detects a road sign in an image with high accuracy by referring to the map information DB 910 based on the position of the vehicle 90. Thereafter, each operation after step St8 is executed. The driving diagnosis apparatus 1 operates as described above.

As described above, in the driving diagnosis apparatus 1 according to the present embodiment, the sign determination unit 103 determines the presence or absence of a "STOP" road sign in an image. However, this determination processing is not limited to the driving diagnosis, and is also applicable to, for example, automatic driving. In this case, a computer including the object detection unit 102 and the sign determination unit 103 is mounted on the vehicle 90, and the computer operates the vehicle 90 in accordance with the determination result of the sign determination unit 103. In the case of autonomous driving, the operation of the driving diagnosis apparatus 1 described above is appropriately changed based on the specification of autonomous driving.

Although some embodiments of the present disclosure have been described in detail, the present disclosure is not limited to the specific embodiments but may be varied or changed within the scope of the present disclosure as claimed.

What is claimed is:

1. An information processing apparatus comprising:

an image processing unit configured to detect a road sign from an image taken by an in-vehicle camera and configured to calculate a reliability indicating a probability that the road sign is of a specific type;

a determination processing unit configured to determine presence or absence of the road sign of the specific type in the image, in a case of the reliability being less than a threshold value, by referring to map information indicating a position of the road sign of the specific type on a map based on a position at which the image is taken, and further configured to, in a case of the reliability being equal to or greater than the threshold value, determine that the road sign of the specific type is present in the image; and an evaluation processing unit configured to evaluate driving of a vehicle equipped with the in-vehicle camera, based on the image, by deciding whether the car is obeying a traffic regulation indicated by the road sign of the specific type or not, when the determination processing unity determines that the road sign of the specific type is present in the image.

2. The information processing apparatus according to claim 1, wherein the determination processing unit is configured to estimate a traveling direction of a vehicle equipped with the in-vehicle camera based on a temporal change in the position at which the image is taken, in the case of the reliability being less than the threshold value, when the road sign of the specific type is present in the traveling direction on the map, the determination processing unit is configured to determine that the road sign of the specific type is present in the image, and in the case of the reliability being less than the threshold value, when the road sign of the specific type is not present in the traveling direction on the map, the determination processing unit is configured to determine that the road sign of the specific type is not present in the image.

3. The information processing apparatus according to claim 1, wherein the image processing unit is configured to detect the road sign from the image by using a detection model that is machine-learned by supervised learning and that receives the image and a type of the road sign and outputs the road sign of the specific type.

* * * * *